United States Patent
Hamilton

(10) Patent No.: US 6,872,265 B2
(45) Date of Patent: Mar. 29, 2005

(54) PHASE-STABILIZED AMMONIUM NITRATE

(75) Inventor: Brian K. Hamilton, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/354,278

(22) Filed: Jan. 30, 2003

(65) Prior Publication Data

US 2004/0149363 A1 Aug. 5, 2004

(51) Int. Cl.$^7$ .......................... D03D 23/00; C06B 31/28
(52) U.S. Cl. ...................................... 149/109.6; 149/46
(58) Field of Search ................................ 149/46, 109.6

(56) References Cited

U.S. PATENT DOCUMENTS

| | | |
|---|---|---|
| 2,220,891 A | 11/1940 | Cook et al. |
| 2,904,420 A | 9/1959 | Holker |
| 3,002,830 A | 10/1961 | Barr |
| 3,067,076 A | 12/1962 | Butcher et al. |
| 3,144,367 A | 8/1964 | Enoksson |
| 3,493,445 A | 2/1970 | Takata et al. |
| 4,001,377 A | 1/1977 | Hahn et al. |
| 4,486,396 A | 12/1984 | Kjøhl et al. |
| 4,552,736 A | 11/1985 | Mishra |
| 4,925,600 A | 5/1990 | Hommel et al. |
| 5,053,086 A | 10/1991 | Henry et al. |
| 5,063,036 A | 11/1991 | Engel et al. |
| 5,071,630 A | 12/1991 | Oberth |
| 5,098,683 A | 3/1992 | Mehrotra et al. |
| 5,125,684 A | 6/1992 | Cartwright |
| 5,139,588 A | 8/1992 | Poole |
| 5,271,778 A | 12/1993 | Bradford et al. |
| 5,292,387 A | 3/1994 | Highsmith et al. |
| 5,460,668 A | 10/1995 | Lyon |
| 5,472,647 A | 12/1995 | Blau et al. |
| 5,516,377 A | 5/1996 | Highsmith et al. |
| 5,518,054 A | 5/1996 | Mitson et al. |
| 5,529,647 A | 6/1996 | Taylor et al. |

(Continued)

FOREIGN PATENT DOCUMENTS

| | | |
|---|---|---|
| DE | 36 42 850 | 2/1988 |
| DE | 44 42 169 C1 | 12/1995 |
| DE | 198 44 350 | 3/2000 |
| EP | 405 272 | 1/1991 |

Primary Examiner—Aileen Felton
(74) Attorney, Agent, or Firm—Sally J. Brown

(57) ABSTRACT

Ammonium nitrate is phase-stabilized by a synergistic phase stabilization additive combination of at least cupric oxide and potassium nitrate. Specifically, phase-stabilized ammonium nitrate contains between about 94.0 and about 96.0 wt. % ammonium nitrate and between about 4 and 6 wt. % of a synergistic phase stabilization additive combination of at least cupric oxide and potassium nitrate, wherein the cupric oxide is present in a relative amount of no more than about 2.0 wt. %. In some cases, additional stability is imparted by the inclusion of zinc oxide such as in a relative amount of no more than about 1.5 wt. %.

15 Claims, 2 Drawing Sheets

U.S. PATENT DOCUMENTS

| | | |
|---|---|---|
| 5,531,941 A | 7/1996 | Poole |
| 5,542,998 A | 8/1996 | Bucerius et al. |
| 5,542,999 A | 8/1996 | Bucerius et al. |
| 5,545,272 A | 8/1996 | Poole et al. |
| 5,583,315 A | 12/1996 | Fleming |
| 5,589,661 A | 12/1996 | Menke et al. |
| 5,592,812 A | 1/1997 | Hinshaw et al. |
| 5,596,168 A | 1/1997 | Menke et al. |
| 5,608,183 A | 3/1997 | Barnes et al. |
| 5,641,938 A | 6/1997 | Holland et al. |
| 5,663,524 A | 9/1997 | Bucerius et al. |
| 5,677,510 A | 10/1997 | Bucerius et al. |
| 5,682,014 A | 10/1997 | Highsmith et al. |
| 5,725,699 A | 3/1998 | Hinshaw et al. |
| 5,726,382 A | 3/1998 | Scheffee et al. |
| 5,735,118 A | 4/1998 | Hinshaw et al. |
| 5,747,730 A | 5/1998 | Scheffee et al. |
| 5,780,768 A | 7/1998 | Knowlton et al. |
| 5,783,773 A | 7/1998 | Poole |
| 5,847,315 A | 12/1998 | Katzakian, Jr. et al. |
| 5,850,053 A | 12/1998 | Scheffee et al. |
| 5,866,842 A | 2/1999 | Wilson et al. |
| 5,962,808 A * | 10/1999 | Lundstrom .................. 149/46 |
| 6,059,906 A | 5/2000 | Fleming et al. |
| 6,077,372 A | 6/2000 | Mendenhall et al. |
| 6,083,331 A | 7/2000 | Taylor et al. |
| 6,103,030 A | 8/2000 | Taylor et al. |
| 6,132,480 A | 10/2000 | Barnes et al. |
| 6,132,538 A | 10/2000 | Mendenhall et al. |
| 6,165,296 A | 12/2000 | Mendenhall et al. |
| 6,224,697 B1 | 5/2001 | Mendenhall et al. |
| 6,315,930 B1 * | 11/2001 | Hamilton .................... 149/46 |
| 6,372,191 B1 | 4/2002 | Mendenhall et al. |
| 6,508,995 B1 | 1/2003 | Engel et al. |
| 2002/0059969 A1 * | 5/2002 | Serizawa et al. .......... 149/19.1 |
| 2002/0195181 A1 * | 12/2002 | Lundstrom et al. ...... 149/19.91 |

* cited by examiner

US 6,872,265 B2

PHASE-STABILIZED AMMONIUM NITRATE

BACKGROUND OF THE INVENTION

This invention relates generally to ammonium nitrate and, more particularly, to the phase stabilization of ammonium nitrate such as to facilitate the incorporation and use of such phase-stabilized ammonium nitrate in gas generant materials such as used in the inflation of automotive inflatable restraint airbag cushions and the like.

Gas generating materials are useful in a variety of different contexts. One significant use for such compositions is in the operation of automotive occupant safety restraints. For example, it is well known to protect a vehicle occupant using a cushion or bag, e.g., an "airbag cushion," that is inflated or expanded with gas when a vehicle encounters sudden deceleration, such as in the event of a collision. In such systems, the airbag cushion is normally housed in an uninflated and folded condition to minimize space requirements. Such systems typically also include one or more crash sensors mounted on or to the frame or body of the vehicle to detect sudden decelerations of the vehicle and to electronically trigger activation of the system. Upon actuation of the system, the cushion begins to be inflated in a matter of no more than a few milliseconds with gas produced or supplied by a device commonly referred to as an "inflator." In practice, such an airbag cushion is typically desirably deployed into a location within the vehicle between the occupant and certain parts of the vehicle interior, such as a door, steering wheel, instrument panel or the like, to prevent or avoid the occupant from forcibly striking such part(s) of the vehicle interior.

Gas generant compositions commonly utilized in the inflation of automotive inflatable restraint airbag cushions have previously most typically employed or been based on sodium azide. Such sodium azide-based compositions, upon initiation, normally produce or form nitrogen gas. While the use of sodium azide and certain other azide-based gas generant materials generally meets current industry specifications, guidelines and standards, such use may involve or raise potential concerns such as relating to the safe and effective handling, supply and ultimate disposal of such gas generant materials.

In view thereof, significant efforts have been directed to minimizing or avoiding the use of sodium azide or other azide-based gas generant components or materials in automotive airbag inflators. Through such efforts, various combinations of non-azide fuels and oxidizers have been proposed for use in gas generant compositions. These non-azide fuels are generally desirably less toxic to make and use, as compared to sodium azide, and may therefore be easier to dispose of and thus, at least in part, found more acceptable by the general public. Further, non-azide fuels composed of carbon, hydrogen, nitrogen and oxygen atoms typically yield all gaseous products upon combustion. As will be appreciated by those skilled in the art, fuel materials having a high content of nitrogen and hydrogen and a low content of carbon are generally attractive for use in such inflatable restraint applications due to the relatively high output of gas resulting therefrom (such as measured in terms of moles of gas produced per 100 grams of gas generant material).

It has previously been proposed to use ammonium nitrate (AN) as an oxidizer in propellant and gas generant formulations, such as gas generant formulations for generating large volumes of gas for use in the inflation of automotive inflatable restraint airbag cushions. In particular, ammonium nitrate advantageously has the potential to be used in gas generant formulations which provide or result in relatively high gas yields, e.g., inflation gas yields of up to 4 moles of gas per 100 grams of formulation. In addition, ammonium nitrate generally exhibits a high degree of chemical stability within typical temperature ranges that such formulations are designed for application including, for example, elevated temperature conditions such as might be encountered within the interior of a vehicle which has been left exposed in the sun.

Unfortunately, the incorporation and use of ammonium nitrate in pyrotechnic gas generant formulations has generally been subject to certain difficulties or limitations. For example, ammonium nitrate-containing pyrotechnic gas generant formulations have commonly been subject to one or more of the following shortcomings: low burn rates, burn rates exhibiting a high sensitivity to pressure, as well as to phase or other changes in crystalline structure such as may be associated with volumetric expansion such as may occur during temperature cycling over the normally expected or anticipated range of storage conditions, e.g., temperatures of about −40° C. to about 110° C. As will be appreciated, such changes of form or structure may result in physical degradation of such gas generant formulation forms such as when such gas generant formulation has been shaped or formed into tablets, wafers or other selected shape or form. In particular, ammonium nitrate is known to undergo temperature-dependent changes through five phase changes, i.e., from Phase I through Phase V, with an especially significant volume change of ammonium nitrate associated with the reversible Phase IV to Phase III transition. Furthermore, such changes, even when relatively minute, can strongly influence the physical properties of a corresponding gas generant material and, in turn, strongly affect the burn rate of the generant material. Unless checked, such changes in ammonium nitrate structure may result in such performance variations in the gas generant materials incorporating such ammonium nitrate as to render such gas generant materials unacceptable for typical inflatable restraint system applications.

It has been found that the phase change-induced degradation of pelletized ammonium nitrate-containing compositions can be mitigated if the humidity is kept extremely low, i.e., if the percent water vapor in the atmosphere is kept below 0.05 wt. %. Maintaining such low humidity levels, however, is generally impractical for most manufacturing situations; thus there is a need and a demand for gas generant compositions in which ammonium nitrate is phase-stabilized under more realistic or practical humidity conditions.

Because ammonium nitrate is prone to such undesirable phase-changes, it is known to stabilize ammonium nitrate to produce phase-stabilized ammonium nitrate (PSAN). In particular, ammonium nitrate has typically been phase-stabilized by admixture and/or reaction with minor amounts of additional chemical species. For example, U.S. Pat. No. 5,071,630 teaches stabilization with zinc oxide (ZnO), U.S. Pat. No. 5,641,938 teaches stabilization with potassium nitrate ($KNO_3$), and U.S. Pat. No. 5,063,036 teaches stabilization with cupric oxide (CuO).

Unfortunately, the inclusion or presence of various of such stabilizer materials in various formulations have proven to result or produce certain undesired consequences. In particular and as further described in more detail below, work by the Applicant has identified disadvantages in a number of such formulations for the intended use of the formulation. For example, the inclusion or use of zinc oxide as such a stabilizer has been found to result or produce desired phase stabilization of the ammonium nitrate but only for a relative short duration of time. The inclusion or use of potassium nitrate as such a stabilizer has been found to be generally limited or restricted by a need to include such a stabilizer in a high relative amount (e.g., in an amount corresponding to 9 weight percent of the formulation) in order to provide desired phase stabilization. Unfortunately, potassium nitrate in such a relative amount has been found to undesirably produce or result in excessive fuming, i.e., generation of particulate matter, such as to make such use less desirable. The inclusion or use of cupric oxide as such a stabilizer has been found to be generally effective, e.g., provide sufficient stability, when used in a relative amount of only about 5 weight percent. Unfortunately, cupric oxide in such a relative amount has been found to undesirably produce or result in the resulting composition having a burning rate with a high dependence on pressure. Those skilled in the art will appreciate that a higher dependence of burning rate on pressure generally makes it more difficult to design devices with stable and predictable internal ballistics.

In view of the above, there is a continuing need and demand for a phase-stabilized ammonium nitrate that satisfies typical gas generant temperature cycling requirements while simultaneously minimizing or avoiding various of the undesirable properties associated with, attributable to or resulting from common ammonium nitrate phase stabilizing additives.

SUMMARY OF THE INVENTION

A general object of the present invention is to provide an improved gas generant formulation that utilizes ammonium nitrate as an oxidizer.

A more particular object of the present invention is to provide an improved gas generant utilizing ammonium nitrate as an oxidizer in which the ammonium nitrate is phase stabilized with minimal production of particulates and minimal adverse effect on performance.

The general object of the invention can be attained, at least in part, through the combination of potassium nitrate and cupric oxide as phase-stabilizers for ammonium nitrate. Potassium nitrate and cupric oxide are found to have a synergistic effect in stabilizing ammonium nitrate, whereby less than half the levels of each of these stabilizers, that each of these stabilizers alone would be needed to achieve a desired degree of stabilization, may be used together to produce the same degree of stabilization. In these compositions, attendant reductions in the undesirable affects that each of these stabilizers by themselves would impart are minimized.

Further in accordance with the invention, whereas ZnO by itself does not impart sufficient phase-stabilization to ammonium nitrate, ZnO in conjunction with CuO and $KNO_3$ as co-stabilizers for ammonium nitrate, provides even better phase-stabilized ammonium nitrate in certain instances.

In particular in accordance with one preferred embodiment of the invention, phase-stabilized ammonium nitrate formulations are provided comprising between about 94.0 and about 96.0 wt. % ammonium nitrate and between about 4 and 6 wt. % of a synergistic phase stabilization additive combination of at least CuO and $KNO_3$, wherein the CuO is present in a relative amount of no more than about 2.0 wt. %, the weight percentages being calculated with the total of the ammonium nitrate and the synergistic phase stabilization additive combination equaling 100 wt. %. In certain formulations, the synergistic phase stabilization additive combination additionally includes ZnO and wherein the ZnO is present in the composition in a relative amount of no more than about 1.5 wt. %.

The invention further comprehends gas generant formulations utilizing ammonium nitrate in which the ammonium nitrate is phase-stabilized with synergistic levels of potassium nitrate and cupric oxide.

The invention further comprehends gas generant formulations utilizing ammonium nitrate in which the ammonium nitrate is phase-stabilized with synergistic levels of potassium nitrate, cupric oxide, and zinc oxide.

As used herein, references to a specific composition, component or material as a "fuel" are to be understood to refer to a chemical that generally lacks sufficient oxygen to burn completely to $CO_2$, $H_2O$ and $N_2$.

Correspondingly, references herein to a specific composition, component or material as an "oxidizer" are to be understood to refer to a chemical generally having more than sufficient oxygen to burn completely to $CO_2$, $H_2O$ and $N_2$.

Other objects and advantages will be apparent to those skilled in the art from the following detailed description taken in conjunction with the appended claims and drawings.

DETAILED DESCRIPTION OF THE INVENTION

The present invention provides improved phase-stabilized ammonium nitrate and gas generant compositions containing such phase-stabilized ammonium nitrate.

Figure 1:
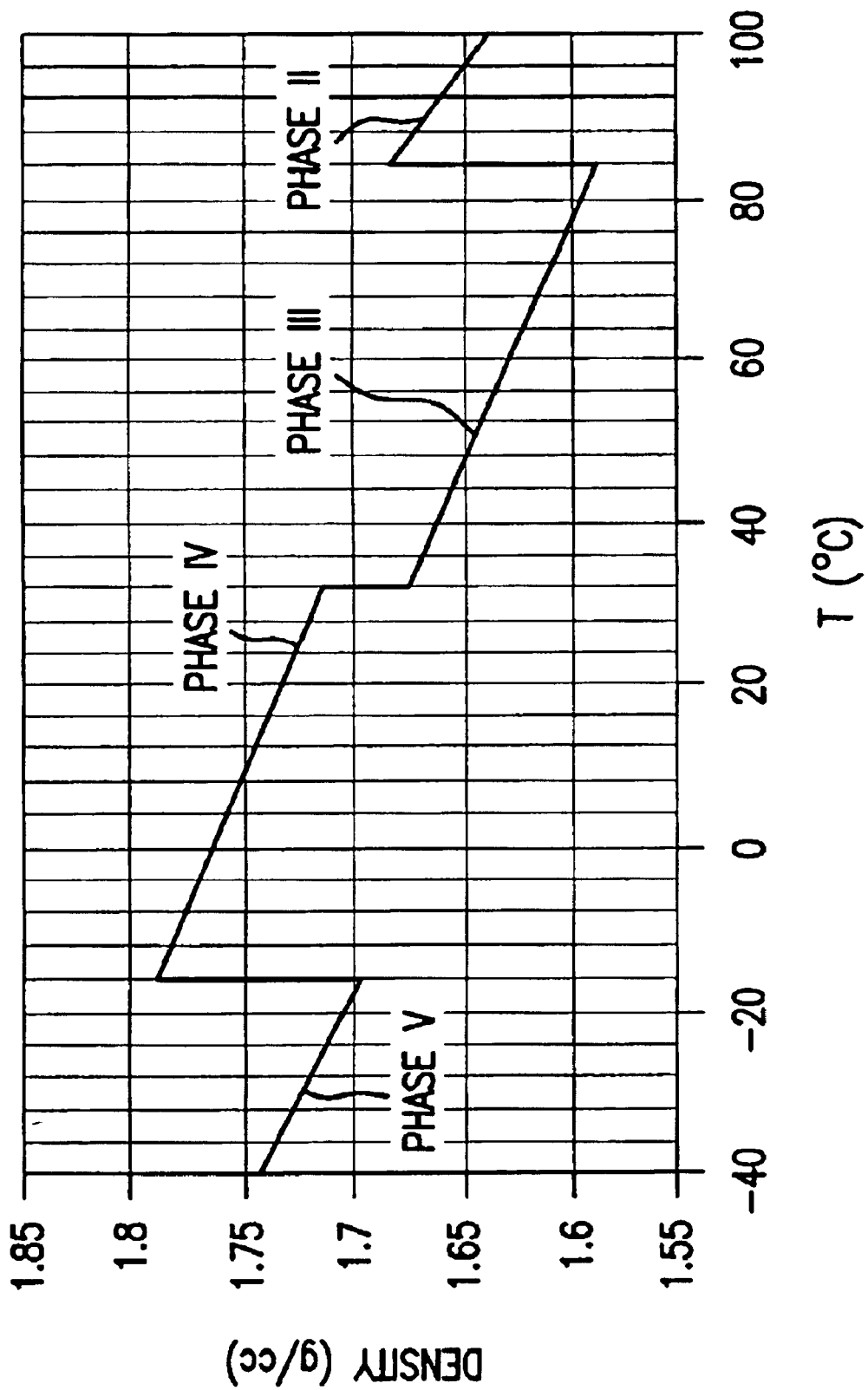
FIG. 1 is a graph illustrating ammonium nitrate density (g/cc) as a function of temperature (° C.)

As discussed hereinabove, ammonium nitrate undergoes temperature-related phase changes and attendant volume changes. FIG. 1 graphically illustrates ammonium nitrate density vs. temperature (T) for the temperature range of −40° C. to 100° C., and shows the associated or accompanying ammonium nitrate phase changes. The most dramatic density (thus volume) changes occur in the −16° C. to 84° C. range in which the ammonium nitrate progresses through Phase IV and Phase III. With increasing temperature, the density decreases (and the volume increases) generally linearly through each of Phase IV and Phase III with a sharp drop in density occurring at the Phase IV to Phase III transition at about 34° C. As will be appreciated, the reverse occurs as the temperature drops from an elevated temperature. When ammonium nitrate has been compacted either alone or in a propellant or gas generant composition into a selected form or structure, e.g., pellets, these significant volume changes typically result in physical instability and eventual breakdown of the compacted structure.

Figure 2:
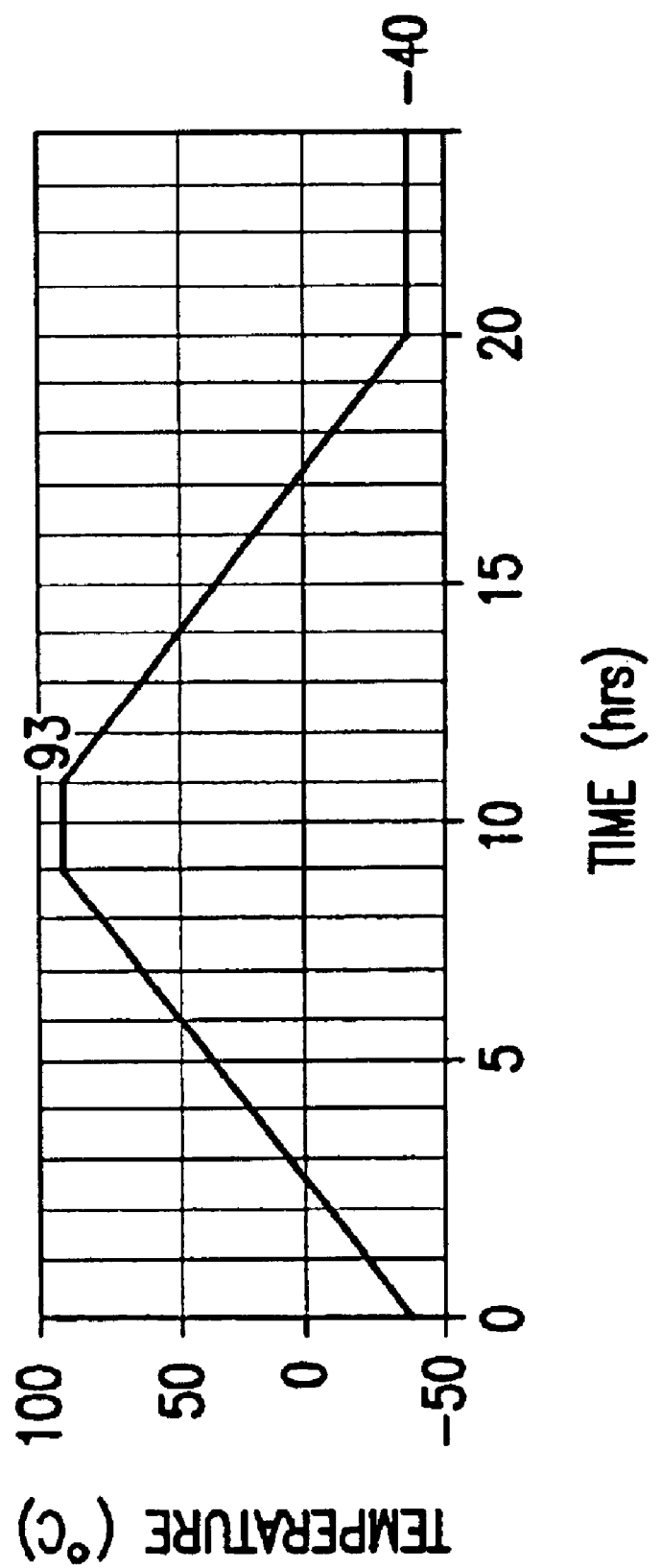
FIG. 2 is a graph showing a temperature/time cycle that applicants used for testing the phase-stability of ammonium nitrate compositions.

In the past, it has been common to employ a three-hour duration temperature cycling protocol in testing compositions for use in airbag inflators. It has been found, however, that a twenty-hour cycling protocol, such as illustrated in FIG. 2, can be effective in discriminating various ammonium nitrate-containing compositions. In particular, the twenty-hour cycling protocol shown in FIG. 2 involves raising the ambient temperature from −40° C. to 93° C. over 9 hours, maintaining the ambient temperature at 93° C. for 2 hours, cooling back to −40° C. over the next 9 hours, and then maintaining the ambient temperature at −40° C. for 4 hours. This cycling was then repeated on a daily basis as necessary to determine physical stability of such formulations.

As identified above, this invention is directed to ammonium nitrate compositions containing phase stabilizing additive materials that minimize temperature-related phase change. The phase-stabilizing materials used in the present invention are all generally known phase stabilizers for ammonium nitrate as described hereinabove. However, as the phase stabilizers used herein have previously been found either relatively ineffective as phase stabilizers and/or to detract from the desired performance of an ammonium nitrate-containing composition in one way or another, the invention is directed to minimizing the amounts of phase stabilizing materials used so as to achieve adequate phase stabilization for the intended end-use, e.g., in propellants or gas generants, while at the same time avoiding or minimizing various undesired properties that such stabilizing materials may impart to the formulation. The invention achieves these goals by using novel mixtures of stabilizing materials in conjunction with ammonium nitrate, which mixtures are found to exhibit synergy with each other when used together in or to form a phase stabilized ammonium nitrate (PSAN) composition.

Herein, in describing PSAN compositions, unless otherwise noted, all percentages are by weight, with the total weight of ammonium nitrate plus stabilizing materials equaling 100 wt. %. This is true, whether the PSAN composition is formulated by itself for subsequent admixture with other components of a propellant or gas generating formulation, or whether used in such a propellant or gas generant formulation. Thus in a composition containing ammonium nitrate, CuO, $KNO_3$, and, optionally, ZnO, the weight percentages discussed in terms of these chemicals is calculated with the total weight of ammonium nitrate, CuO, $KNO_3$, and ZnO equaling 100%.

In accordance with a primary aspect of the invention, it has been found that the combination of cupric oxide (CuO) and potassium nitrate ($KNO_3$) act in synergistic fashion to phase-stabilize ammonium nitrate. As detailed below, a phase stabilized ammonium nitrate composition in accordance with the invention desirably may include between about 94 and about 96 wt. % ammonium nitrate and only between about 4 and 6 wt. % of a synergistic phase stabilization additive combination of at least CuO and $KNO_3$, wherein the CuO is present in a relative amount of no more than about 2.0 wt. %, the weight percentages being calculated with the total of the ammonium nitrate and the synergistic phase stabilization additive combination equaling 100 wt. %, in order to achieve or provide desired or required phase stabilization. More particularly, such a synergistic phase stabilization additive combination desirably utilizes or employs the additives CuO and $KNO_3$ in such a phase stabilizing combination in relative amounts less than half the relative amount of each of these materials may be needed if either were used alone for such phase stabilization. For example and as identified above, whereas either 5% CuO or 9% $KNO_3$ has previously been found required to result or achieve a desired degree of ammonium nitrate phase stabilization, Applicant has found that the same degree of stabilization can be attained using only 2 wt. % CuO and only 4 wt. % $KNO_3$ (e.g., a composition containing 94 wt. % ammonium nitrate, 2 wt. % CuO, and 4 wt. % $KNO_3$), or meaningfully less than half the amount of each of these materials when used alone. While such a reduction, as a percentage of total formulations is not great, such a reduction is significant when viewed as a percentage of each of the chemicals; i.e., 2 wt. % CuO is 20% less than 2.5 wt. %; 4 wt. % $KNO_3$ 11% less than 4.5 wt. %. Those skilled in the art and guided by the teachings herein provided will appreciate that reducing the relative amount of CuO generally reduces the burning rate dependency on pressure for the resulting formulation (e.g., reduces the pressure exponent in the burning rate equation). Furthermore, reducing the relative amount of $KNO_3$ in the formulations, desirably reduces the amount or extent of fuming upon reaction by the formulation, i.e., less particulate material is generated upon reaction. It should be understood, however, that the invention is not limited to formulations in which less than half of each chemical is used, as balancing of properties, such as the burning rate pressure dependency and particulate generation, is formula specific, the invention is directed to any formulation having levels of both CuO and $KNO_3$ such that a synergistic phase-stabilizing effect is exhibited. Likewise, while Applicant has in the past achieved adequate phase-stabilization of ammonium nitrate for a particular purpose with 5 wt. % CuO alone, and 9 wt. % $KNO_3$ alone, other purposes may require even higher degree of ammonium nitrate phase-stabilization; thus, the 5 wt. % CuO and 9 wt. % $KNO_3$ values do not represent upper limits of either, even when these two chemical species are used in combination as ammonium nitrate phase stabilizers.

The phase-stabilization realized by the compositions of the present invention are exhibited when compositions are manufactured at humidity conditions consistent with practical manufacturing conditions. Although it is desirable to manufacture gas generant compositions at low humidity conditions, the compositions of the present invention do not require extremely low humidity conditions for phase-stability.

ZnO has also been tested for its efficacy for stabilizing ammonium nitrate. While ZnO alone was found to impart some phase stability, it was found to be far less effective than either $KNO_3$ or CuO at comparable weight percentages. Applicant has found, however, that ZnO, when used in conjunction with the $KNO_3$/CuO combination of stabilizers, does impart benefits in many PSAN formulations, as has been exhibited by reduced size growth of ammonium nitrate-containing pellets which also contain such $KNO_3$, CuO and ZnO, after repeated temperature cycling. Also, the inclusion of ZnO has been found to reduce filming, i.e., particulate formation, and is therefore desirable in many formulations. Accordingly, in accordance with certain preferred embodiments of the invention, PSAN formulations, in addition to $KNO_3$ and CuO, contain ZnO at a level of no more than about 1.5 wt. % and, preferably, at a level of between about 0.75 wt. % and about 1.2 wt. %.

Those skilled in the art and guided by the teachings herein provided will appreciate that PSAN in accordance with the invention may be appropriately used along or in conjunction with fuel and other components of a propellant or gas generant, such as known in the art. Further, a propellant or gas generant may, if desired, contain or include oxidizers in addition to the PSAN of the present invention.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Example 1

A composition containing 3.2 wt. % potassium nitrate, 0.800 wt. % CuO, and 96 wt. % ammonium nitrate was prepared. The components were ground in a crucible and fused as 5-gram cylindrical slugs of 5.7 mm diameter, 5 mm height. The pellets were subjected continuously to the twenty-four hour temperature cycle described above in reference to FIG. 2 with a 2 hr. dwell time at 93° C. and a 4 hr. dwell time at −40° C. for 365 cycles (1 yr.). There was no visible change in the pellets. Thus, cupric oxide and potassium nitrate are effective, synergistic phase-stabilizers for ammonium nitrate.

Example 2

Sample specimens of ammonium nitrate containing varying weight percentages of CuO, ZnO, and $KNO_3$ phase stabilization additives, incorporated by fusion, were prepared. In each case, a 150 mg sample was press-pelletized and dried. The samples were each stabilized at a moisture content of 0.5±0.25 wt. %, to simulate uncontrolled storage. Each of the sample specimens was then tested for phase stability by determining the volume growth for each pellet after 69 of the twenty-four hour temperature cycle described above in reference to FIG. 2.

These pellets varied widely in their volumetric growth, depending on their additive composition. The best composition (in terms of minimizing such volumetric growth) was a composition containing 1.33 wt. % CuO, 1.15 wt. % ZnO and 2.40 wt. % $KNO_3$. This sample, which initially had a 0.63% moisture content, showed a linear growth of only 0.56% and showed no flaws (e.g., cracks) in its pellet geometry.

Discussion of Results

As shown by the results in the preceding example, phase stabilization in accordance with the invention can be realized with a composition containing between about 94 and about 96 wt. % ammonium nitrate and between about 4 and 6 wt. % of a synergistic phase stabilization additive combination of at least CuO and $KNO_3$, wherein the CuO is present in a relative amount of no more than about 2.0 wt. %, the weight percentages being calculated with the total of the ammonium nitrate and the synergistic phase stabilization additive combination equaling 100 wt. %.

As will be appreciated, such phase stabilization is achieved via a synergistic combination of phase stabilization additives such that the combined effect of such additives is significantly greater than would be obtained via the inclusion of a corresponding amount of any of these additives on its own.

The invention illustratively disclosed herein suitably may be practiced in the absence of any element, part, step, component, or ingredient that is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. In a method of phase-stabilizing ammonium nitrate, the improvement comprising adding a phase stabilization additive combination of at least CuO and $KNO_3$ to ammonium nitrate to form a phase stabilized ammonium nitrate composition containing between about 94 and about 96 wt. % ammonium nitrate and between about 4 and 6 wt. % of the phase stabilization additive combination, wherein the CuO is present in a relative amount of no more than about 2.0 wt. %, the weight percentages being calculated with the total of the ammonium nitrate and the phase stabilization additive combination equaling 100 wt. %.

2. The method of claim 1 wherein the phase stabilization additive combination additionally comprises ZnO.

3. The method of claim 2 wherein the ZnO is present in the composition in a relative amount of no more than about 1.5 wt. %.

4. The method of claim 2 wherein the ZnO is present in the composition in a relative amount of between about 0.75 and 1.2 wt. %.

5. A phase stabilized ammonium nitrate composition made by the method of claim 1.

6. A gas generant composition comprising a fuel material and the phase-stabilized ammonium nitrate composition of claim 5.

7. A phase stabilized ammonium nitrate composition made by the method of claim 2.

8. A gas generant composition comprising a fuel material and the phase-stabilized ammonium nitrate composition of claim 7.

9. A phase stabilized ammonium nitrate composition made by the method of claim 3.

10. A gas generant composition comprising a fuel material and the phase-stabilized ammonium nitrate composition of claim 9.

11. A phase stabilized ammonium nitrate composition made by the method of claim 4.

12. A gas generant composition comprising a fuel material and the phase-stabilized ammonium nitrate composition of claim 11.

13. In a method of phase-stabilizing ammonium nitrate, the improvement comprising:

adding a phase stabilization additive combination of CuO and $KNO_3$ and up to about 1.5 wt. % ZnO to ammonium nitrate to form a phase-stabilizing ammonium nitrate composition containing between about 94 and about 96 wt. % ammonium nitrate and between about 4 and 6 wt. % of the phase stabilization additive combination, wherein the CuO is present in a relative amount of no more than about 2.0 wt. %, the weight percentages being calculated with the total of the ammonium nitrate and the phase stabilization additive combination equaling 100 wt. %.

14. The method of claim 13 wherein the ZnO is present in the composition in a relative amount of between about 0.75 and 1.2 wt. %.

15. In a method of phase-stabilizing ammonium nitrate, the improvement comprising adding a phase stabilization additive combination, consisting essentially of CuO and $KNO_3$, to ammonium nitrate to form a phase stabilized ammonium nitrate composition containing between about 94 and about 96 wt. % ammonium nitrate and between about 4 and 6 wt. % of the phase stabilization additive combination, wherein the CuO is present in a relative amount of no more than about 2.0 wt. %, the weight percentages being calculated with the total of the ammonium nitrate and the phase stabilization additive combination equaling 100 wt. %.

* * * * *